(12) United States Patent
Pyo

(10) Patent No.: US 6,419,299 B1
(45) Date of Patent: Jul. 16, 2002

(54) CARGO SPACE EXPANDING DEVICE OF VEHICLE

(75) Inventor: Ha Geun Pyo, Ulsan-shi (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/988,312

(22) Filed: Nov. 19, 2001

(30) Foreign Application Priority Data

Jun. 12, 2001 (KR) ........................................ 2001-32738

(51) Int. Cl.$^7$ ................................................ B60J 1/00
(52) U.S. Cl. ..................... 296/146.16; 296/56; 296/106; 296/146.8; 296/190.11; 296/201; 49/372; 49/374; 49/375; 49/377
(58) Field of Search ........................ 296/146.16, 146.8, 296/56, 106, 201, 190.11; 49/372, 374, 377, 375

(56) References Cited

U.S. PATENT DOCUMENTS

| | | | | |
|---|---|---|---|---|
| 2,747,921 A | * | 5/1956 | Hooverson et al. ......... | 296/136 |
| 3,214,213 A | * | 10/1965 | Hezler, Jr. et al. .......... | 160/201 |
| 3,770,312 A | * | 11/1973 | Shadburn ............... | 296/146.16 |
| 4,119,341 A | * | 10/1978 | Cook .................... | 296/146.16 |
| 4,793,099 A | * | 12/1988 | Friese et al. ........... | 296/146.16 |
| 5,169,205 A | * | 12/1992 | James .......................... | 292/21 |
| 5,702,146 A | * | 12/1997 | Asami ................... | 296/146.15 |
| 5,934,727 A | * | 8/1999 | Storc et al. .............. | 296/26.11 |
| 6,260,916 B1 | * | 7/2001 | Hunt ..................... | 296/146.16 |

* cited by examiner

Primary Examiner—Stephen T. Gordon
Assistant Examiner—Lori L Coletta
(74) Attorney, Agent, or Firm—Birch, Stewart, Kolasch & Birch, LLP

(57) ABSTRACT

A cargo space expanding device of a vehicle is disclosed to prevent any damage from being made by a loaded matter by getting the upper part of glass to be completely inserted into a mid-gate, the device comprising: a piece of glass fixed by holding unit onto a roof panel; and a mid-gate hinged by rotating unit mounted at a body panel with a hollow part filled with a cushioning member like sponge or urethane foam for getting the glass drawn inside, wherein the holding unit comprises pressing unit fixed at the glass and manipulating unit hinged with the pressing unit and coupled with a fixing edge of a grip member mounted at the roof panel to support the upper end of the glass.

6 Claims, 7 Drawing Sheets

CARGO SPACE EXPANDING DEVICE OF VEHICLE

BACKGROUND OF THE INVENTION

1. Field of the Invention

The present invention relates to a cargo space expanding device of a vehicle and more particularly to a cargo space expanding device of a vehicle to prevent any damage by completely accommodating glass into a mid-gate that can be folded out into the internal side of the vehicle.

2. Brief Description of the Prior Art

In general, a hollow space is offered to load cargoes at a rear part of a vehicle. The vehicle mainly aiming at carrying cargoes or freights as shown in FIG. 1, is made to load bulky matter in the hollow cargo space, if needed, by expanding even to inner space of the vehicle formed by a vehicle glass G and an internally foldable mid-gate 20, so called a rear-panel.

In such a vehicle, parts are generally provided for blocking or expanding the inner space and the cargo space, as shown in FIG. 2, such as a piece of glass G fixed onto a roof panel, holding means 50 provided between the upper edge of the glass G and the roof panel 10 for fixing the glass G, a mid-gate 20 having a hollow space into which sponge or urethane cushioning member 80 are stuffed for inducing the glass G, and rotating means 40 hinged at the bottom part of the mid-gate 20 for fixing and supporting through the body panel T and for getting the mid-gate 20 folded into the inner space of a vehicle.

At this time, the holding means 50 includes a latch assembly 60 having a vertically movable hook accommodated at a hole 61*a* of a fixing bracket 61 fixed by a fixing member at the glass G and a striker 70 having a hitching bracket 71 coupled with the roof panel 10 by a fixing member 72 for being locked or unlocked with the latch assembly 60.

Furthermore, the latch assembly 60, as shown in FIG. 3, includes a hook 62 in which a hitching chuck 62*a* having a plurality of vertical slots 62*a*' is fixed by a spring 63 in the hole 61*a* of the fixing bracket 61 and a vertically movable knob 62*b* is added for being vertically moved through a movement slot 61*b* formed at the lateral side of the fixing bracket 61.

Also, rotating means 40 positioned at the lower part of the mid-gate 20 is constructed with a fixing bracket 41 installed at the body panel T just like in the prior art, and a connection bracket 42 fixed at the inner side of the mid-gate 20 and a hinge pin 43 coupled between brackets 41, 42 for hinging the mid-gate 20 to be folded to the inner side of the vehicle.

Accordingly, after the knob 62*b* formed at the hook 62 of the latch assembly 60 of the holding means 50 is pulled down to release the hitching chuck 62*a* of the latch assembly 60 out of the hitching bracket 71 of the striker 70 and insert the glass G into the mid-gate 20, a bulky matter M like an auto-bike is loaded at the trunk and the inner space of a back seat with the mid-gate 20 being pulled and folded into the inner side of the vehicle by the hinge pin 43 of the rotating means 40 as shown in FIG. 5.

However, the holding means 50 assembled at the upper part of the glass G which will be inserted into the inwardly foldable mid-gate 20 is exposed outside as shown in FIG. 4. In other words, the holding means 50 is assembled out of the length L' of the glass G, longer than the length L of the mid-gate 20, to be exposed out of the folded mid-gate 20 as shown in FIG. 5. Therefore, the prior art has a disadvantage that a damage may be made by a contact with the matter M when or while it is loaded at the cargo space of the vehicle.

SUMMARY OF THE INVENTION

It is an object of the present invention to solve the aforementioned problem and provide a cargo space expanding device of a vehicle which can prevent any damage from being made by a loaded matter by getting the upper part of glass to be completely inserted into a mid-gate.

In order to accomplish the aforementioned object of the present invention, there is provided a cargo space expanding device of a vehicle, the device comprising:

a piece of glass fixed by holding means onto a roof panel; and a mid-gate hinged by rotating means mounted at a body panel with a hollow part filled with a cushioning member like sponge or urethane foam for getting the glass drawn inside, wherein the holding means comprises pressing means fixed at the glass and manipulating means hinged with the pressing means and coupled with a fixing edge of a grip member mounted at the roof panel to support the upper end of the glass.

BRIEF DESCRIPTION OF THE DRAWINGS

Objects and aspects of the invention will become apparent from the following description of preferred embodiments with reference to the accompanying drawings in which.

DETAILED DESCRIPTION OF THE INVENTION

A preferred embodiment of the present invention will be described with reference to accompanying drawings.

Figure 6:
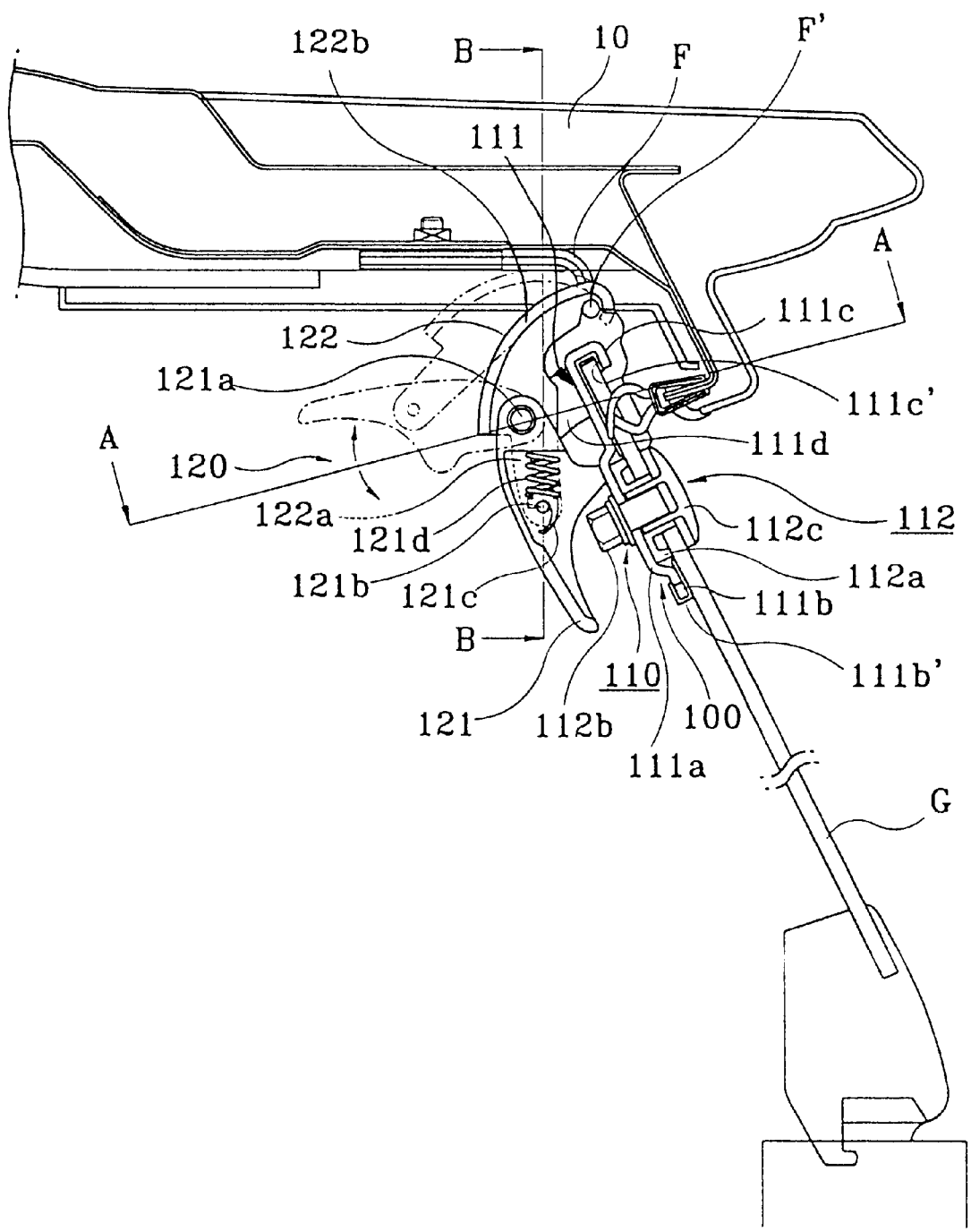
FIG. 6 is a structural view for illustrating glass fixing means in accordance with the present invention.

FIG. 6 is a structural view of glass fixing means in accordance with the present invention, comprising: a piece of glass G fixed by holding means 100 onto a roof panel; and a mid-gate 20 hinged by rotating means 40 mounted at a body panel T with a hollow part filled with a cushioning member like sponge or urethane foam for-getting the glass drawn inside, wherein the holding means 100 comprises pressing means 110 fixed at the glass G and manipulating means 120 hinged with the pressing means 110 and coupled with a fixing edge F' of a grip member F mounted at the roof panel 10 to support the upper end of the glass G.

Hereinafter, the pressing means 110 includes a pressing plate 111 wrapping around the upper end of the glass G and a fixing member 112 to fix the pressing plate 111. At this time, the pressing plate 111 further includes a first supporting part 111b having an additional pad 111b' of sponge or urethane foam at the one side of the protruded pressing part 111a and a second supporting part 111c having an additional pad 111c' of sponge or urethane foam at the other side of the protruded pressing part 111a and a vertically protruded supporting shaft 111d wrapping around-the end of the glass G. The fixing member 112 includes a rubber bush 112a added onto the protruded pressing part 111a and coupled through the glass G and a bolt 112b penetrating through the pressing part 111a and screwed with a nut 112c.

Also, the manipulating means 120 includes a handle 121 coupled by a fixing pin 121a with the supporting shaft 111d for pressing down the pressing part 111a of the pressing plate 111 at the position of being locked, and a hook 122 coupled at the center of the handle 121 by a movable pin 121b and coupled the fixing end F' of the grip member F.

Figure 7:
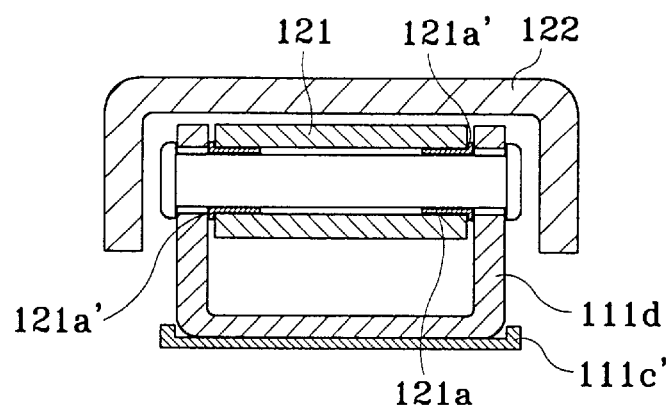
FIG. 7 is a cross-sectional view for illustrating a part cut along line A—A.

At this time, the handle 121, as shown in FIG. 7, is rotatively coupled by the fixing pin 121a with the inner side of the supporting shaft 111d of the pressing plate 111, and a pad 121a' of urethane foam is inserted at both sides between the handle 121 and the fixing pin 121a for reducing friction in rotations.

Figure 8:
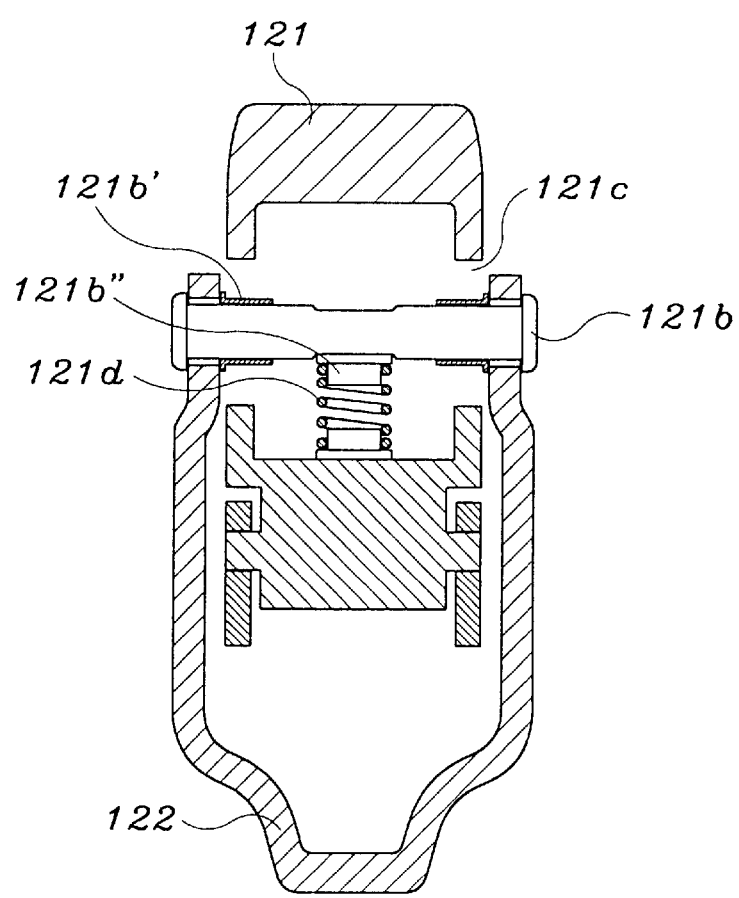
FIG. 8 is a cross-sectional view for illustrating a part cut along line B—B.

Furthermore, the hook 122 coupled at the handle 121, as shown in FIG. 8, includes a moving part 122a coupled by a movement shaft 121b penetrating a movement slot 121c formed at the handle 121 and a locking part 122b integrally formed at the moving part 122a for pressing down the fixing end F' of the grip member F. An elastic member 121d, a spring, is longitudinally positioned between the movement shaft 121b and one side of the movement slot 121c of the handle 121.

At this time, the pad 121b' of the urethane foam is inserted at both sides between the movement shaft 121b and the hook 122 for reducing friction in rotations. On the other hand, a boss 121b" accommodating an elastic member 121d is included at the center of the movement shaft 121b and the movement slot 121c of the handle 121.

Operations of the present invention will be described in detail.

First of all, when a person pulls up one end of the handle 121 assembled at the upper end of the roof panel 10 and glass G, which constructs the manipulating means 120 of the holding means 100 to fix the glass G, the handle 121 hinges by way of the fixing pin 121a of the supporting shaft 111d provided at the pressing plate 111 with to be swung open.

Then, the hook 122 penetrated through the movement slot 121c of the handle 121 and fixed by the movement shaft 121b is folded out together with the handle 121 as shown in FIG. 6, and the moving,part 122a of the hook 122 is lifted from the glass G. As a result, the pressing force of the locking part 122b of the hook 122 is relieved of the fixing end F' of the grip member F.

At this time, the elastic member 121d, spring, positioned between the movement shaft 121b that combines the movement slots 121c of the handle 121 and the hook 122 at the handle 121 returns to its original state, moves the handle and hook 122 by its elastic force. On the other hand, when the handle 121 is lowered down to the glass G again, the elastic member is pressed down to gain its elastic force.

Likewise, when the locking part 122b of the, hook 122 is released out of the fixing end F' of the grip member F by taking off the handle 121 and relieving the pressing force of the hook 122, the glass G gets loose to enable the glass G to move down into the mid-gate 20 for accommodation. At this time, the glass G, as in the prior art, reduces its dropping shock with the cushioning member 80 filled in the hollow space of the mid-gate 20.

On the other hand, the glass G accommodated in the mid-gate 20 is positioned within the length L' of the glass G, so that it is completely accommodated into the mid-gate 20 without any exposure.

Figure 1:
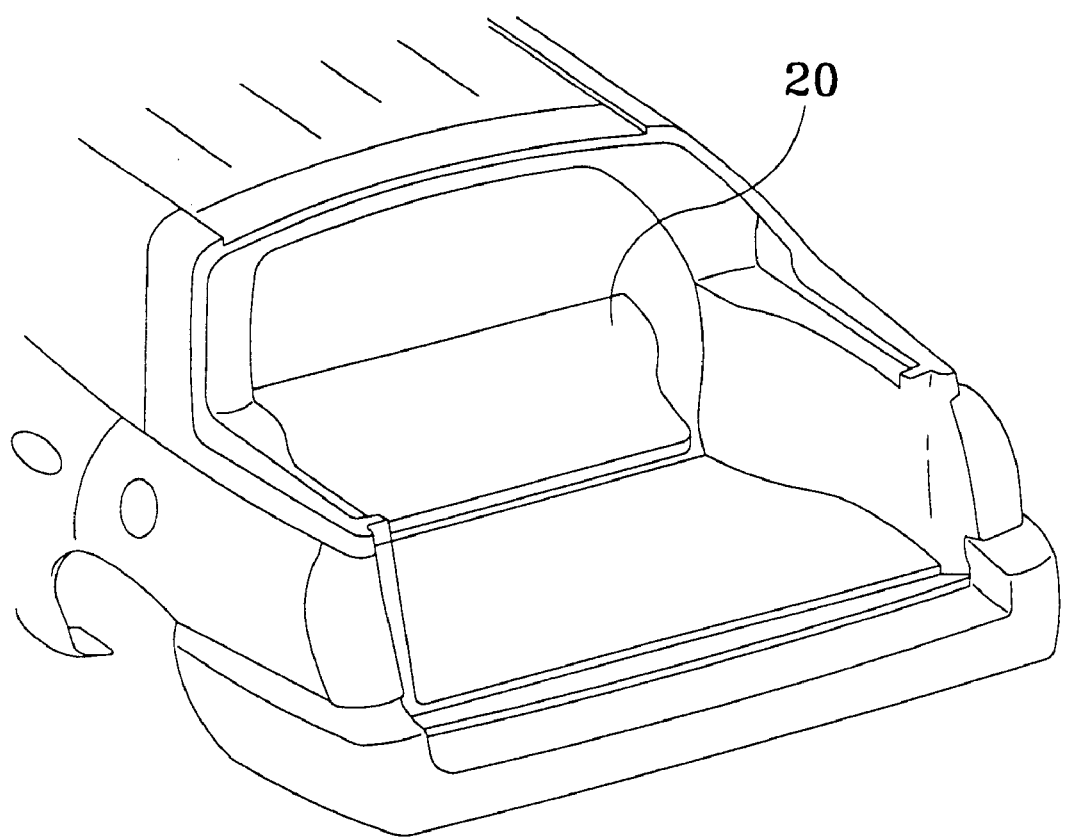
FIG. 1 is a schematic structural view for illustrating a cargo space expanding apparatus of a vehicle in accordance with the prior art.
Figure 2:
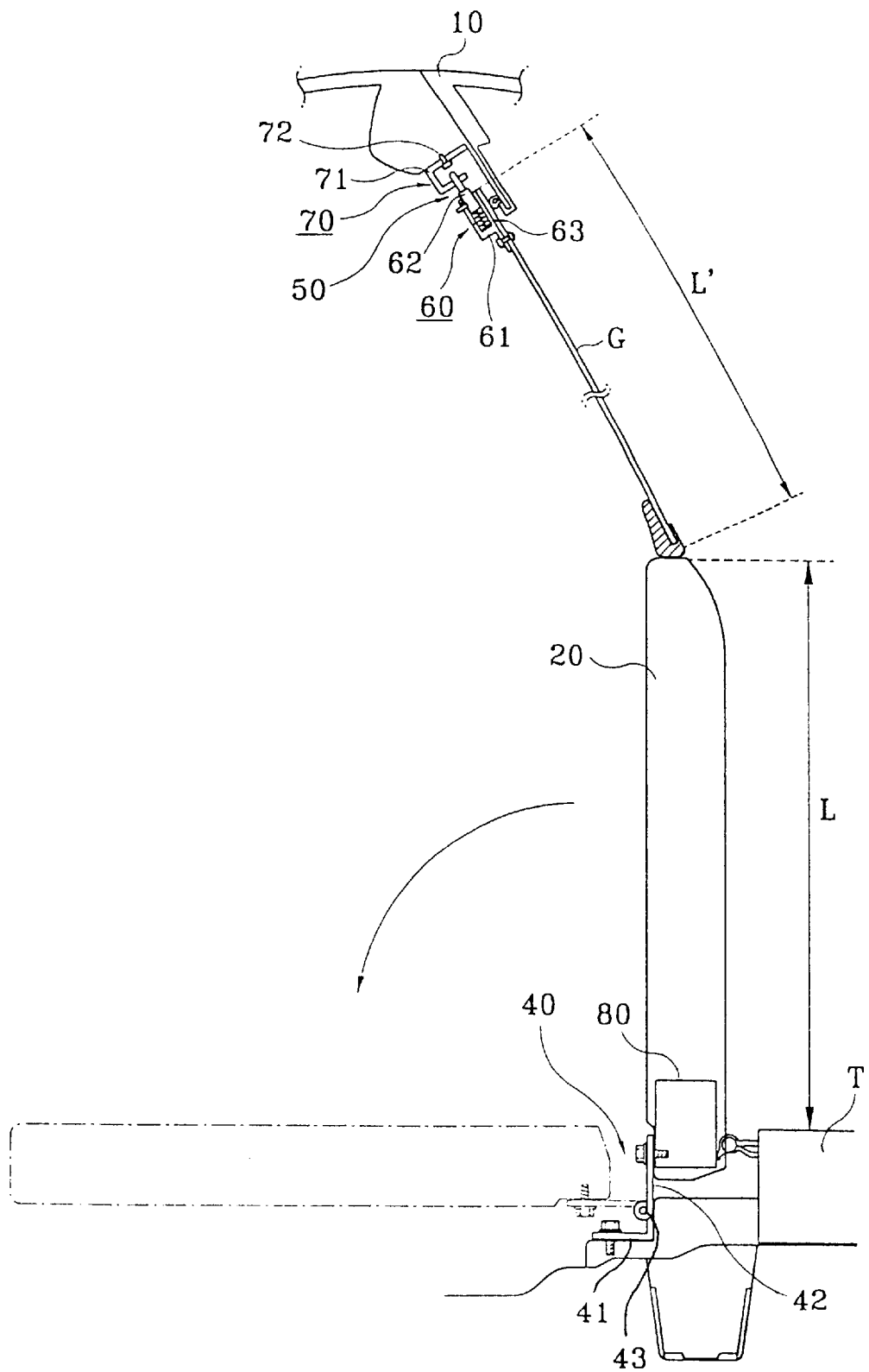
FIG. 2 is a structural view for illustrating a cargo space expanding apparatus of a vehicle in accordance with the prior art.
Figure 3:
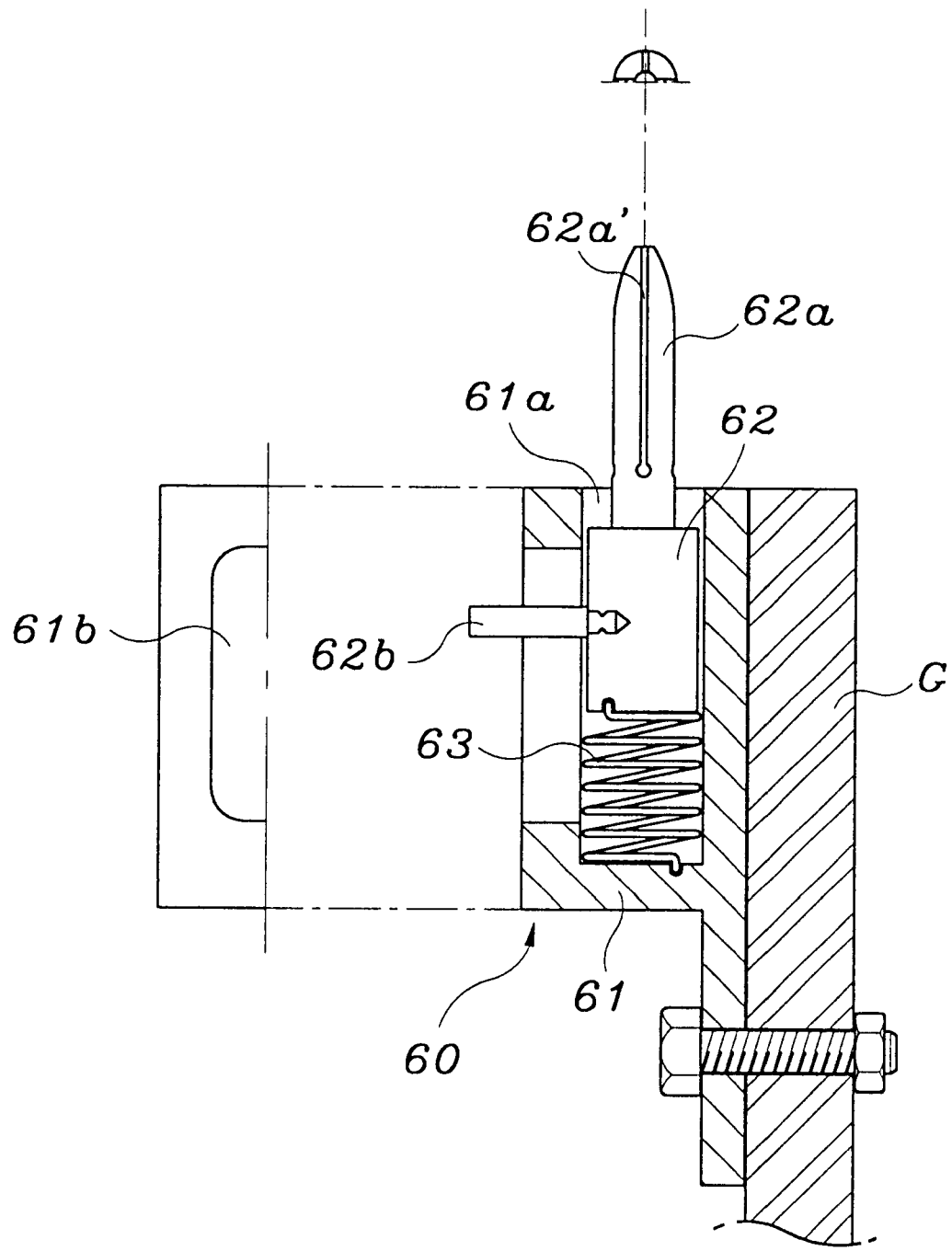
FIG. 3 is a structural view for illustrating the glass fixing means shown in FIG. 2.
Figure 4:
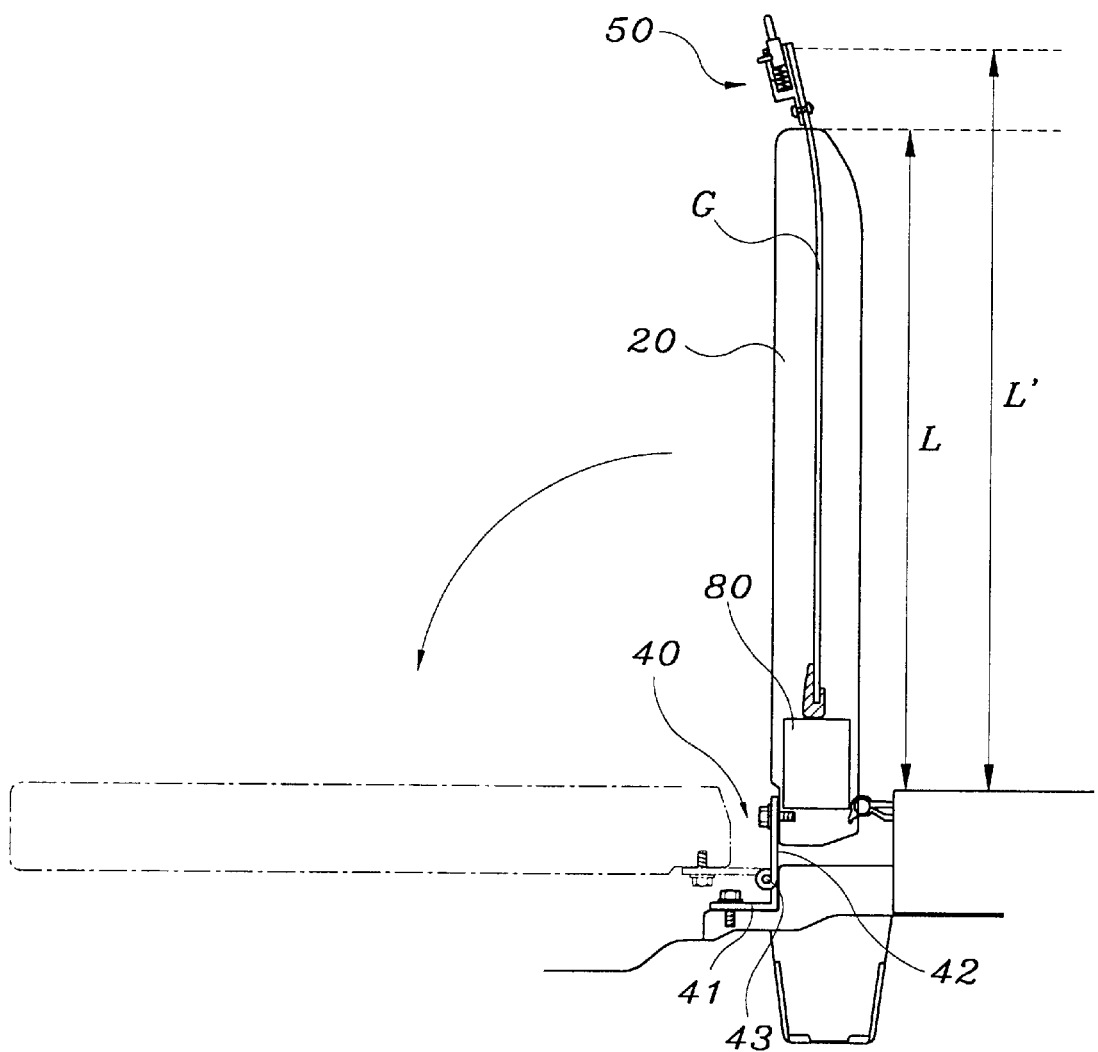
FIG. 4 illustrates an operational state of a cargo space expanding apparatus of a vehicle in accordance with the prior art.
Figure 5:
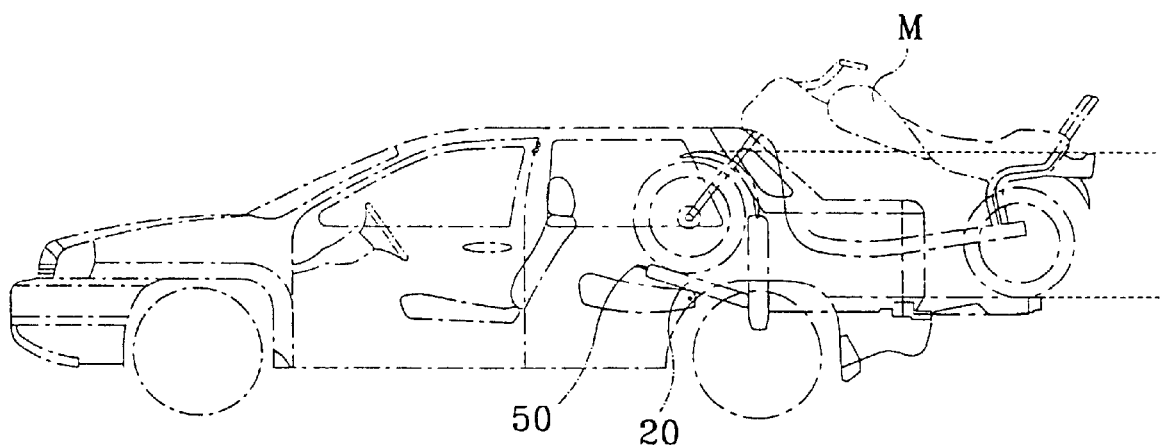
FIG. 5 illustrates an operational state of a cargo space expanding apparatus of a vehicle loaded with cargo in accordance with the prior art.

Accordingly, as shown in FIG. 5, even if a bulky matter M like a motorcycle is loaded at the trunk and indoor space of the back seat of the vehicle, it is possible to prevent any damage onto the glass G.

As described above, the glass G that blocks the inner space of the vehicle and the upper part of the cargo loading space is completely accommodated into the mid-gate that can be folded into the inner side of the vehicle. As a result, the present invention is advantageous in preventing the loaded matter from making any damage onto the glass or holding means by expanding the cargo loading space of a vehicle.

What is claimed is:

1. A cargo space expanding device of a vehicle, which comprises:

a piece of glass fixed by holding means onto a roof panel; and a mid-gate hinged by rotating means mounted at a body panel with a hollow part filled with a cushioning member like sponge or urethane foam for getting the glass to be drawn inside, wherein the holding means comprises pressing means fixed at the glass and manipulating means hinged with the pressing means and coupled with a fixing edge of a grip member mounted at the roof panel to support the upper end of the glass.

2. The device, as defined in claim 1, wherein the pressing means comprises a pressing plate wrapping around an upper end of the glass and a fixing member to fix the pressing plate, the fixing plate further comprising a first supporting part having an additional pad of sponge or urethane foam at the one side of a protruded pressing part and a second supporting part having an additional pad of sponge or urethane foam at the other side of the protruded pressing part and a vertically protruded supporting shaft wrapping around the end of the glass, and the fixing member comprising a rubber bush added onto the protruded pressing part and coupled through the glass and a bolt penetrating through the pressing part to be screwed with a nut.

3. The device, as defined in claim 1, wherein the manipulating means comprises a handle coupled by a fixing pin with a supporting shaft for pressing down a pressing part of a pressing plate at a position of being locked, and a hook coupled at the center of the handle by a movable pin to be coupled with a fixing end of the grip member.

4. The device, as defined in claim 3, wherein the hook comprises a moving part coupled by a movement shaft penetrating a movement slot formed at the handle and a locking part integrally formed at the moving part for pressing down the fixing end of the grip member, and an elastic member is longitudinally positioned between the movement shaft and one side of the movement slot of the handle.

5. The device, as defined in claim 4, wherein a boss for accommodating an elastic member is formed at the center of the movement shaft and the movement slot of the handle.

6. The device, as defined in any one of claims 2 through 4, wherein a pad of sponge or urethane foam is formed between the first and second supporting parts of the pressing plate and glass, between the handle and fixing pin, and between the movement shaft and hook.

* * * * *